United States Patent [19]

Cousins

[11] 4,392,050
[45] Jul. 5, 1983

[54] RAPID RESPONSE THERMAL SWITCH FOR ISOLATED LOAD CONTROL

[75] Inventor: Otto J. Cousins, Burbank, Ill.

[73] Assignee: Harper-Wyman Company, Hinsdale, Ill.

[21] Appl. No.: 255,660

[22] Filed: Apr. 20, 1981

[51] Int. Cl.$^3$ .............................................. H05B 1/02
[52] U.S. Cl. .................................... 219/491; 337/105; 337/44; 337/101; 219/494; 219/511
[58] Field of Search ...................... 337/41, 44, 51, 52, 337/67, 84, 86, 87, 88, 92, 93, 101, 102–106; 219/482, 490, 491, 494, 511

[56] References Cited

U.S. PATENT DOCUMENTS

| | | | |
|---|---|---|---|
| 1,581,714 | 4/1926 | Appelberg | 337/105 |
| 3,735,316 | 5/1973 | Thorsteinsson | 337/101 |
| 3,946,200 | 3/1976 | Juodikis | 219/499 |
| 3,980,420 | 9/1976 | Baysinger | 431/78 |

Primary Examiner—B. A. Reynolds
Assistant Examiner—Teresa J. Walberg
Attorney, Agent, or Firm—Mason, Kolehmainen, Rathburn & Wyss

[57] ABSTRACT

A rapid response thermal switch for isolated load control includes a bimetallic switch electrically connected to a controller and operatively connected to a switch follower which controls the operation of a second switch electrically connected to a load so that the load is electrically isolated from the controller. While energization of the bimetallic switch by the controller causes the bimetallic switch to move away from its switch follower, the switch follower is biased to follow the bimetallic switch. The initial movement of the switch follower allows the load current controlling switch to close, energizing the load. The bimetallic element, heated by the controller currents flexes to cycle itself on and off while maintaining the load controlling switch in the closed position. When the bimetallic element sufficiently cools after deenergization, it returns the bimetallic switch to its closed position. The load current control switch is quickly opened, when the controller turns off, by the reverse movement of the bimetallic element since the switch follower is always in contact with the bimetallic switch and the bimetallic switch maintains itself in a position to quickly operate the load current controlling switch.

11 Claims, 4 Drawing Figures

RAPID RESPONSE THERMAL SWITCH FOR ISOLATED LOAD CONTROL

BACKGROUND OF THE INVENTION

A. Field of the Invention

This invention relates generally to an electronic apparatus for controlling the current through a high power or high transient load and particularly to such a device including a thermal switch which rapidly responds to changing control signals.

B. Description of the Background Art

In the past, mechanical switches have been used to cycle the current to a load such as the heating element of an oven or range. The use of a thermostatically operated switch to regulate the time which energy is supplied to a heating element is described, for example, in U.S. Pat. Nos. 2,830,164, 2,892,918, and 3,070,684.

Increasingly, with the advent of low cost electronic components, workers in fields involving the control of high power loads such as heating elements have sought to produce entirely electronic control devices. While such devices are theoretically desirable in terms of reliability of operation, cost of production, and speed of response, these devices are sometimes disadvantageous in that the electronic components are unsuitable for use in a high current, voltage, or transient environment.

SUMMARY OF THE INVENTION

It is an object of the present invention to provide a thermal relay which rapidly responds to changing control signals while electrically isolating the controller from the load.

It is another object of the present invention to provide a switching device which enables electronic components to be utilized in the control of high current, voltage or transient loads.

It is yet another object of the present invention to provide a temperature control device utilizing an electronic controller which operates at one voltage level and a load control switch which operates at a different voltage to control the current to the heating element load.

It is still another object of the present invention to provide a thermal switch for isolated load control which can be produced at low cost and which overcomes many of the disadvantages inherent in the prior art devices.

These and many other objects and advantages of the present invention are achieved by a thermal switch for controlling the energization of a load in response to the application of a control signal produced by a controller. The thermal switch includes a bimetallic actuator and an electrical heater adjacent the bimetallic actuator. A first set of cycling contacts, movable between opened and closed positions in response to movement of the bimetallic actuator, are included in a control circuit. The heater is adapted to be connected to the control circuit for energization of the heater with a control signal when the first set of cycling contacts is in the closed position. A second set of contacts movable between closed and open positions in response to movement of the bimetallic actuator is included in a load circuit adapted to be connected to the load and to a power source for energization of the load when the second set of contacts is in the closed position. The bimetallic actuator has a normal position when unheated with the first set of contacts being closed and the second set of contacts being open. The bimetallic actuator is movable in response to heat to a position wherein the second set of contacts closes and in response to additional heat to a position wherein the first set of contacts opens and the second set of contacts remains closed.

DETAILED DESCRIPTION OF THE PREFERRED EMBODIMENT

Figures 1, 2:
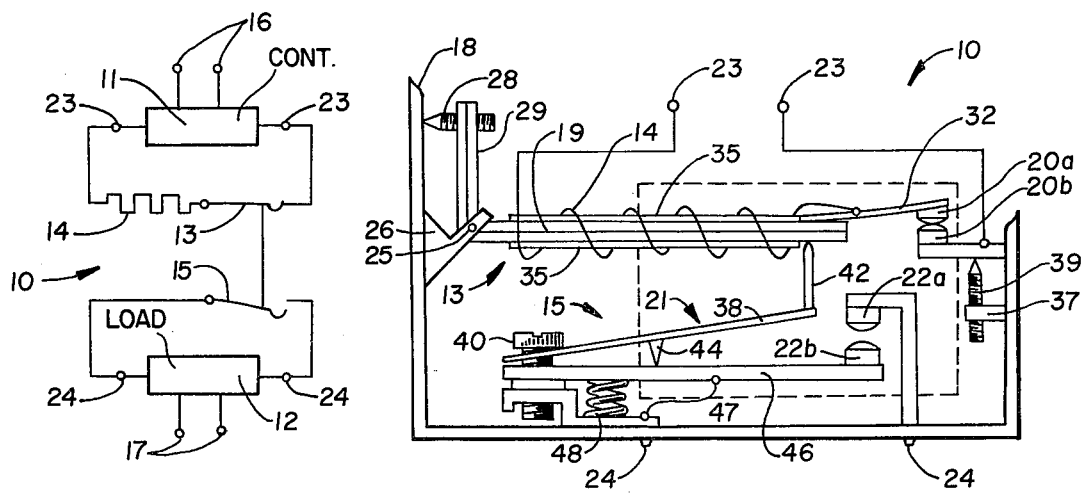
FIG. 1 is a circuit schematic of one embodiment of the present invention.
FIG. 2 is a front elevational view of a switch for implementing the embodiment of the present invention shown in FIG. 1.

Referring to the drawing wherein like reference numerals are used for like parts throughout the several views, a thermal switch 10, shown in FIG. 1, is operative to convey control signals from a controller 11 to a load 12 while isolating the controller 11 from the current and voltage conditions in the circuit including the load 12. The switch 10 includes a bimetallic controller circuit switch 13, with a heating element 14 and a load circuit switch 15 controlling the current to the load 12 in response to instructions from the controller 11. The controller 11 is electrically connected across a first voltage source through the terminals 16 while the load 12 is electrically connected to a second voltage source through the terminals 17.

The thermal switch 10, shown partially enclosed in a housing 18 in FIG. 2, includes the switch 13 with a bimetallic actuator 19 and a first pair of opposed cycling electrical contacts 20, and the switch 15 with a switch follower 21 and a second pair of opposed electrical contacts 22. The terminals 23 provide a means for connecting the controller 11 to the controller circuit switch 13 while the terminals 24 enable connection of the load 12 to the load circuit switch 15.

The bimetallic actuator 19, conveniently generally L-shaped, is mounted for rotation at its corner on a pivot 25 and bracket 26. To one side of the pivot 25 a heated portion 27 is surrounded by a heating coil 14, conveniently a resistance heating coil, electrically isolated from the portion 27 by the electrically insulating strips 35. A set screw 28 threads through the unheated arm 29 of the actuator 19 to adjust the initial position of the actuator 19 and to provide ambient temperature compensation. Thus, if the surrounding atmosphere is abnormal, either unusually hot or cold, the arm 29 buckles between the set screw 28 and the pivot 25 causing the heated portion 27 of the actuator 19 to be rotated to its predetermined initial position regardless of the ambient temperature.

The free end of the heated portion 27 is attached to an electrically conductive leaf spring 32 that carries one of the first pair of contacts 20. The leaf spring 32 is arranged to bias the contact 20a against the contact 20b when the actuator 19 is in the position shown in FIG. 2. This completes a control circuit across the contacts 20, through the leaf spring 32, the heater winding 14 for the bimetallic actuator 19, and the controller 11, connected to the switch 10 at the terminals 23. The controller 11 provides current through the heater winding 14 when the contacts 20 are closed, causing the bimetallic actuator 19 to be heated and to flex upwardly in a conventional way, eventually resulting in the opening of the contacts 20, limiting the upward flexing of the actuator. The set screw 39 threads through the arm 37 and operates against the lower side of the contact 20b to adjust the contact's initial position.

The switch follower 21, mounted on the housing 18, includes a cantilevered leaf spring 38 fixed at one end by a set screw 40 with a generally vertically extending, electrically insulating finger 42 attached to the free end of the spring 38, and a fulcrum 44 positioned between the fixed and free ends of the spring 38. The fulcrum 44 is supported on a spring biased contact member 46 fixed by the set screw 40 through one end thereof and carrying on its free end the contact 22b. The electrically conductive contact member 46 is biased upwardly by a coiled spring 48. Thus, absent the cantilevered leaf spring 38, the contact member 46 would be biased upwardly bringing the contacts 22 into electrical connection, completing the electrical circuit, through the member 46 and wire 47, including the load 12 connected to the switch 10 through the terminals 24. However, the cantilevered leaf spring 38 is normally arranged to bias the finger 42 against the underside of the actuator 19 thereby in turn biasing the contacts 22 open. The magnitude of the biasing force applied by the finger 42 is adjusted by the set screws 28 and 40.

The controller 11 can take a wide variety of forms, depending on the particular application of the switch 10. In general, it is the function of the controller 11 to generate current when necessary to achieve the desired load current characteristics. For example, the controllers disclosed in U.S. Pat. Nos. 3,980,420 to Baysinger et al., for controlling gas ranges by comparing detected and pre-set temperatures, and 3,946,200 to Juodikis for controlling electrical heaters, both patents hereby expressly incorporated by reference herein, may be utilized as the controller 11. In addition, the switch 10 can be used in connection with the controllers discussed in copending U.S. patent applications, Ser. Nos. 113,733 to Schmitz and 113,734 to Bergquist, both filed on Jan. 21, 1980 and commonly assigned to the assignee of the present invention, both applications hereby expressly incorporated by reference herein.

When utilized in temperature responsive control applications, the controller 11 receives a signal from a temperature sensor located near the heating element load and adjusts the current to the switch 10 in response to the difference between the pre-set and the sensed temperatures. Thus, the load 12 such as an oven heating element can be operated, for example, by a 240 volt source while the controller 11 is connected to a 120 volt source. However, the switch 10 is useful in any application where it is desired to isolate a controller that may include sensitive electronic components from a high power or high transient load and where the operative environment, economic or other considerations militate against the use of triac or optical isolation.

Figure 3:
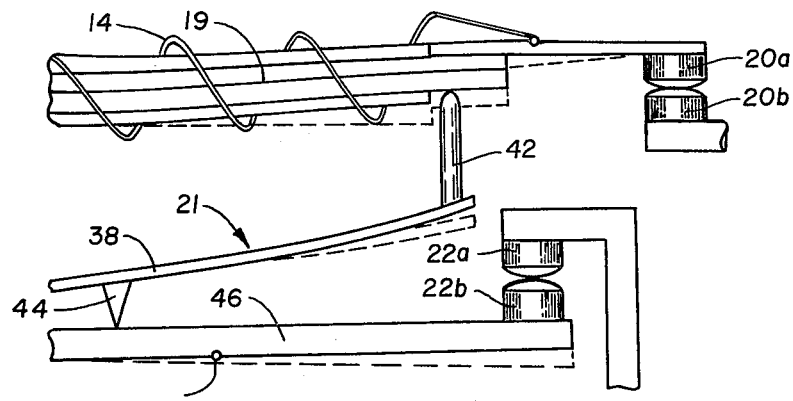
FIGS. 3 and 4 are enlarged, front elevational views of the portion of the present invention enclosed in dotted lines in FIG. 2, in two different operative positions.

As long as no current is flowing through the heating winding 14 the bimetallic actuator 19 stays in the position shown in FIGS. 1 and 2 with the contacts 20 completing a circuit with the controller 11, and the contacts 22 opening the load circuit. When the controller 11 is energized, the bimetallic actuator 19 is heated by the heating winding 14 causing the actuator 19 to deflect upwardly from the position shown in dotted lines in FIG. 3 to the position shown in solid lines in FIG. 3.

Since the leaf spring 32 biases the contact 20a against the contact 20b the spring 32 provides a lost motion connection between the actuator 19 and the contacts 20 so that the initial movement of the actuator 19 does not separate the contacts 20. However, as the actuator 19 deflects upwardly, the switch follower 21 moves upwardly, following the movement of the actuator 19 and closing the contacts 22. This is because as the cantilevered leaf spring 38 deflects upwardly, the downward force against the contact member 46 is decreased allowing the coiled spring 48 to deflect the contact member 46 upwardly bringing the contacts 22 together. As a result, current is supplied to the load 12.

Figure 4:
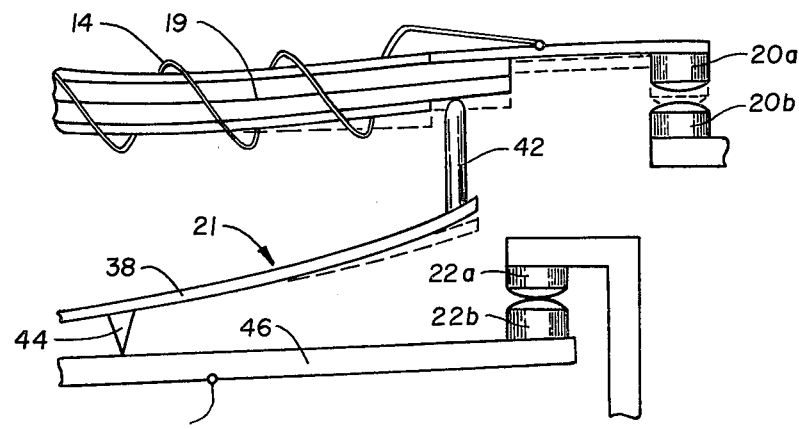

When the actuator 19, heated by the current flowing through the heating element 14, has deflected upwardly sufficiently to overcome the initial bias of the leaf spring 32, the contacts 20 are separated, as shown in FIG. 4. However, the continued upward movement of the actuator 19 has no effect on the contacts 22 since the follower 21 provides a lost motion connection between the actuator 19 and the member 46. As a result the power to the load 12 is unaffected by the opening of the contacts 20 which merely allows the bimetallic actuator 19 to cool. Eventually the bimetallic actuator cools sufficiently to return from the position shown in solid lines in FIG. 4 to the position shown in dotted lines in FIG. 4, reinstating electrical connection between the contacts 20. In this way the maximum deflection of the bimetallic actuator 19 is limited so that the actuator 19 is always maintained in a position to enable it to quickly actuate the follower 21 and the contacts 22. However, the opening of the contacts 20 which permits the actuator 19 to maintain a desired position does not affect the power to the load 12. As long as the controller 11 supplies current, the switch 10 cycles between the positions shown in FIGS. 3 and 4 with the contacts 22 remaining closed. When the controller 11 ceases to supply current, the switch 10 returns to the position, shown in FIG. 2, with the contacts 20 closed and the contacts 22 open.

With this arrangement the controller 11 is able to control the current to the loading 12 without being exposed to the current, voltage, or transient conditions existing in load 12 circuit. At the same time, the response time of the system is not significantly affected for many applications by the interposition of mechanical elements between the controller 11 which may be composed of high speed electronic components, and the load 12.

It should be understood that numerous modifications of the invention described herein can be designed by those skilled in the art that fall within the spirit and scope of the principles of the present invention, such as for example using a conventional snap spring switch whose spring biased actuator is in contact with the actuator 19, in place of the follower 21 and contacts 22, even if the invention is not practiced as specifically described herein.

What is claimed and desired to be secured by Letters Patent of the United States is:

1. A thermal switch for controlling the energization of a load in response to a control signal from a controller, said thermal switch comprising:
   a bimetallic actuator;
   an electrical heater adjacent said bimetallic actuator;
   a first set of contacts movable between open and closed positions in response to movement of said bimetallic actuator;

a control circuit including said first set of contacts and said heater, adapted to be connected to said controller for energization of said heater with the control signal when said first set of contacts is in said closed position;

a second set of contacts electrically isolated from said first set of contacts and being movable between closed and open positions in response to movement of said bimetallic actuator;

means responsive to movement of said bimetallic actuator for operating said second set of contacts between said closed and open positions;

a load circuit including said second set of contacts, adapted to be connected to said load and to a power source for energization of said load once said second set of contacts is in said closed position;

said bimetallic actuator having a normal position when unheated, said first set of contacts being closed and said second set of contacts being open in said normal position; and said bimetallic actuator being movable in response to heat from said energized heater to a position wherein said second set of contacts closes and in response to additional heat from continued energization of said heater to a position wherein said first set of contacts opens and said second set of contacts remains closed.

2. The switch of claim 1 including means for compensating said bimetallic actuator for ambient temperature fluctuations.

3. The switch of claim 1 wherein said operating means includes a switch follower operatively connected to said bimetallic actuator and at least one of said second set of contacts, to close said second set of contacts when said controller applies current to said heater.

4. The switch of claim 3 wherein said follower includes a member, spring biased against said actuator and operatively connected to one of said second set of contacts.

5. The switch of claim 4 wherein one of said second set of contacts is mounted on a cantilevered arm spring biased against said member, such that movement of said member away from said arm results in closing of said second set of contacts.

6. The switch of claim 5 including lost motion means operatively connected to said actuator and to one of said first set of contacts for providing lost motion between said actuator and said first set of contacts so that said actuator is movable through a predetermined distance without corresponding movement of said one of said first set of contacts.

7. The switch of claim 6 wherein said lost motion means includes a spring biased portion connected to said actuator and biasing said first set of contacts together.

8. The switch of claim 3 wherein said follower includes means for providing lost motion between said actuator and said second set of contacts so that said actuator is movable through a predetermined distance without corresponding movement of said one of said second set of contacts.

9. The switch of claim 8 wherein said lost motion means includes a cantilevered leaf spring, biased against said actuator, one of said second set of contacts including a cantilevered arm, whose fixed end is secured to the fixed end of said spring, the free end of said arm being spring biased toward said spring and including one of said second set of contacts mounted thereon, and a spacer element being positioned between said arm and said spring generally intermediately along their lengths.

10. The switch of claim 1 wherein said load is connected across said second set of contacts and said controller is connected across said first set of contacts, said controller and said load being supplied by voltage sources of different potential.

11. The switch of claim 10 wherein said load is a heating element, said controller including a temperature sensor located adjacent said element and a means for setting a desired temperature, said controller including means for varying the current to said actuator in response to the difference between the temperature detected by said sensor and the setting on said setting means.

* * * * *